United States Patent [19]

Lagree et al.

[11] Patent Number: 5,207,806
[45] Date of Patent: May 4, 1993

[54] DUAL PRODUCT PRESSURE SWING ADSORPTION AND MEMBRANE OPERATIONS

[75] Inventors: Dale A. Lagree, Williamsville; David R. Thompson, Grand Island, both of N.Y.

[73] Assignee: Praxair Technology, Inc., Danbury, Conn.

[21] Appl. No.: 772,867

[22] Filed: Oct. 8, 1991

[51] Int. Cl.$^5$ .................. B01D 53/22; B01D 53/04
[52] U.S. Cl. .......................................... 55/16; 55/18; 55/26; 55/68; 55/75; 55/158; 55/179; 55/270; 55/389
[58] Field of Search ............... 55/16, 18, 25, 26, 58, 55/62, 68, 74, 75, 158, 179, 387, 389, 160, 270, 271, 274

[56] References Cited
U.S. PATENT DOCUMENTS

| | | |
|---|---|---|
| 4,238,204 | 12/1980 | Perry ............................... 55/16 |
| 4,645,516 | 2/1987 | Doshi ............................... 55/16 |
| 4,687,498 | 8/1987 | Maclean et al. ................... 62/17 |
| 4,690,695 | 9/1987 | Doshi ............................... 55/16 |
| 4,701,187 | 10/1987 | Choe et al. ...................... 55/16 |
| 4,765,804 | 8/1988 | Lloyd-Williams et al. ....... 55/16 |
| 4,783,203 | 11/1988 | Doshi ............................... 55/16 |
| 4,836,833 | 6/1989 | Nicholas et al. .................. 55/16 |
| 4,863,492 | 9/1989 | Doshi et al. ...................... 55/16 |
| 5,004,482 | 4/1991 | Haas et al. ..................... 55/26 X |

FOREIGN PATENT DOCUMENTS 0335418 10/1989 European Pat. Off. ............ 55/25

*Primary Examiner*—Robert Spitzer
*Attorney, Agent, or Firm*—Alvin H. Fritschler

[57] ABSTRACT

The waste gas of PSA-air separation operations is passed to a membrane system for enhanced recovery of a second product. By capturing the portion found to contain a high concentration of either nitrogen or oxygen in the waste stream, the efficiency of the overall separation is enhanced.

20 Claims, 1 Drawing Sheet

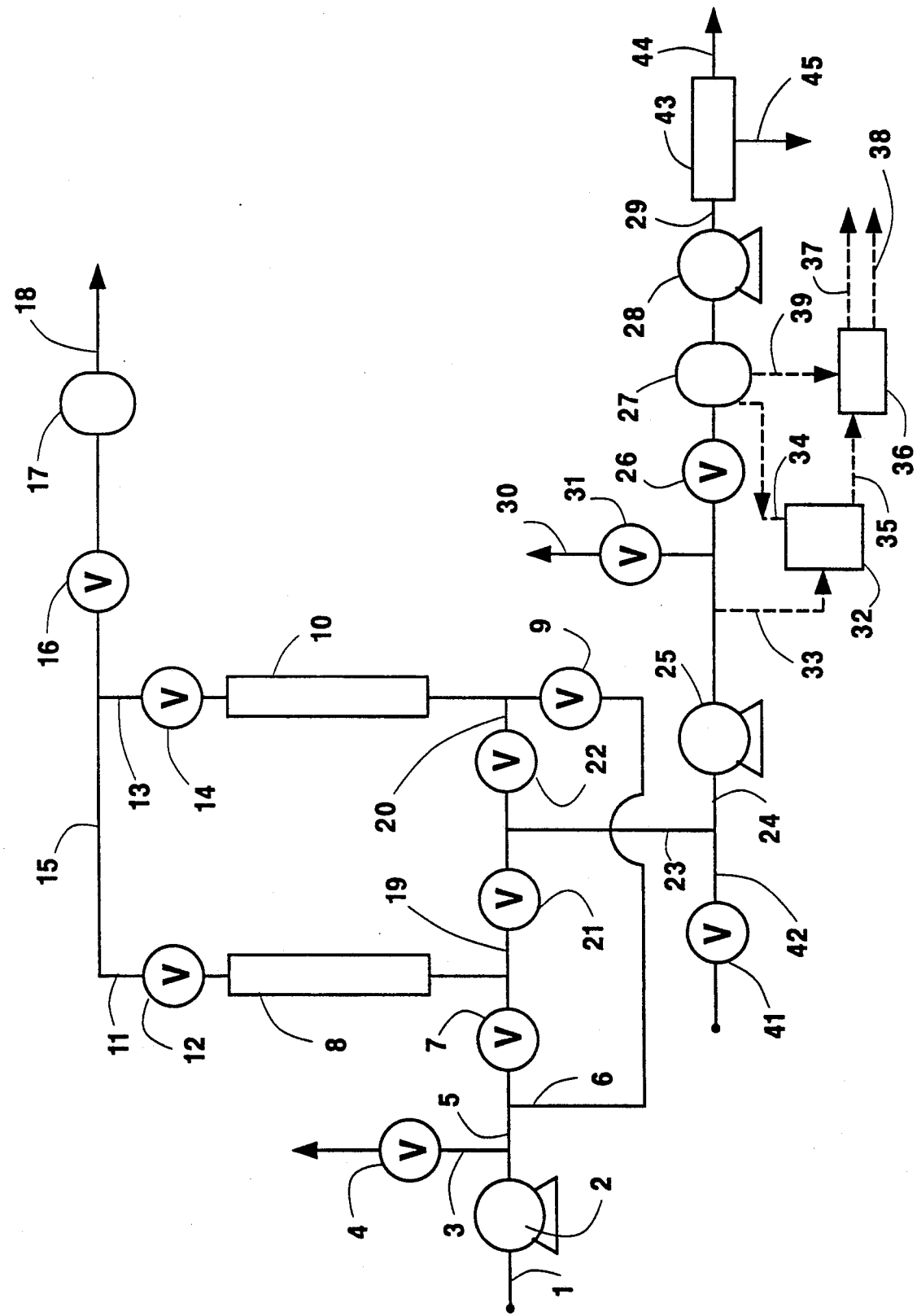

DUAL PRODUCT PRESSURE SWING ADSORPTION AND MEMBRANE OPERATIONS

BACKGROUND OF THE INVENTION

1. Field of the Invention

The invention relates to the separation of gases by the use of pressure using adsorption and membrane gas separation processes and systems. More particularly, it relates to the recovery of a high purity product gas and a high purity secondary product gas thereby.

2. Description of the Prior Art

Pressure swing adsorption (PSA) processes and systems are employed in a wide variety of industrial applications to produce high purity gas streams. In such processing, a feed gas mixture containing a more readily adsorbable component and a less readily adsorbable component are commonly passed to an adsorbent bed capable of selectively adsorbing the more readily adsorbable component at an upper adsorption pressure. The bed is thereafter depressurized to a lower desorption pressure for desorption of the more readily adsorbable component from the adsorbent material and its removal from the bed prior to the introduction of additional quantities of the feed gas mixture to the bed as cyclic adsorption-desorption operations are continued in the bed. Such PSA processing is commonly carried out in multi-bed systems, with each bed undergoing the desired PSA processing sequence on a cyclic basis interrelated to the carrying out of such processing sequence in each other bed in the system.

PSA systems are typically used in industrial applications to produce a single product stream from a given feed gas supply. For air separation purposes, PSA systems achieve the desired separation of oxygen and nitrogen because of the greater selectivity of the adsorbent employed for either oxygen or nitrogen. The adsorptive capacity of any particular adsorbent material increases at higher pressure levels and decreases at lower pressures. In PSA processes and systems for the production of high Purity oxygen product, the adsorbent employed may be one having a greater selectivity for either the desired oxygen product or for nitrogen. In systems in which the adsorbent employed is a nitrogen selective material, such as zeolitic molecular sieves, product oxygen is produced as the less readily adsorbable component removed from the bed during the adsorption step at the upper adsorption pressure. When oxygen is the desired product in systems employing an oxygen selective material, such as carbon molecular sieves, product oxygen is produced as the more readily adsorbable component upon the depressurization of the adsorbent bed to its lower desorption pressure. In PSA processes and systems in which nitrogen is the desired product, similar effects will pertain depending on whether the PSA system employs an oxygen or a nitrogen selective adsorbent.

Those skilled in the art will appreciate that PSA systems inherently can not completely separate any given feed stream component from the other components of the feed stream. In general, the PSA separation produces a product gas stream that contains a high percentage of one component together with a small amount of the remaining components. The other stream removed from the PSA system, i.e. the waste stream, will contain all of the incoming feed stream components. The fact that the adsorption system does not completely separate any component of the incoming feed stream from the other components is often the reason why a so-called waste stream exists in PSA processing. Quite frequently, this non-product waste stream does not contain a sufficiently high percentage of any given component to be of use in practical commercial operations. Therefore, this stream is of no significant value to the end user of the gas separation operation.

In the commercially important PSA-air separation technology, it is nevertheless desirable to recover the most prominent component of the waste stream, whether oxygen or nitrogen, as a separate high purity gas stream. Such recovery would serve to enhance the technical and economic feasibility of employing PSA operations in an ever-increasing field of industrially significant applications. In a typical adsorption process for air separation to produce oxygen, for example, the average oxygen purity of the waste stream will typically be about 10, with the remaining 90% of the waste stream comprising mostly nitrogen. Compared to the composition of air, the oxygen purity of the waste stream is reduced by more than 50% compared to that of air. Therefore, producing a desired purity of nitrogen from this waste stream would inherently require a smaller and less costly separation unit than is needed in the processing of a feed air stream, since more than half of the oxygen present in air has already been removed. Additionally, any compression equipment required in supplying this waste stream to a separation unit would be smaller and would consume less power that is required for air processing. Any approach to capturing the valuable component from the waste stream, however, must be capable of economically as having this desirable result, so that the cost of the additional operation does not exceed the savings obtained by so-capturing said component.

It is an object of the invention, therefore, to provide for the separation of a feed gas mixture using a PSA system and the recovery of a valuable component of the feed gas mixture from the PSA waste stream.

It is another object of the invention to provide a PSA air separation process and system capable of producing oxygen or nitrogen product, with enhanced means for recovering a high purity stream comprising the most prominent component of the waste stream thereupon.

With these and other objects in mind, the invention is herewith described in detail the novel feature thereof being particularly pointed out in the appended claims.

SUMMARY OF THE INVENTION

The invention preferably captures a portion of the PSA-gas separation waste stream that contains a high concentration of the desired component of the non-primary product waste stream to produce an enriched second product stream upon further processing in a permeable membrane system.

BRIEF DESCRIPTION OF THE DRAWING

The invention is hereinafter described with reference to the accompanying drawing comprising a process flow diagram for a PSA oxygen system wherein nitrogen enriched waste gas recovered from the PSA system is passed to a permeable membrane system to produce a nitrogen-rich by-product stream.

DETAILED DESCRIPTION OF THE INVENTION

The object of the invention are preferably accomplished by receiving the portion of a PSA waste stream that contains a high concentration of the desired component as an enriched product stream that can advantageously be passed to a permeable membrane system for further purification. This approach is feasible because the instantaneous purity of the PSA waste stream is found to vary during the production of said waste stream. As a result, capturing the highest concentration portion of the waste stream results in the obtaining of a high purity stream enriched in the component that otherwise would be discharged with the PSA waste stream.

In the practice of the invention, the instantaneous purity of the waste stream is monitored and this stream is captured whenever its purity meets or exceeds a minimum acceptable level. When the purity level of the waste stream is lower than such minimum acceptable level, the waste stream is vented as is customarily the practice with all of the waste gas from PSA-air separation operations. For this purpose, two control valves can be used to direct the flow of the waste stream. The control valves operate directly opposite one another with one valve being used to capture the waste stream, and the other being used to vent this stream. The operation of the valves is based on the instantaneous purity reading of the waste gas.

Since the desired component of the waste gas is recovered in a batch mode, a surge tank is employed to maintain a continuous flow of the desired enriched component as a dual product stream to the end user. Compression of said dual product stream to a desired operating pressure occurs downstream of the surge tank.

With reference to the PSA-oxygen system of the drawing, feed air is passed through line 1 and air compressor 2 for passage to a PSA bed at a desired higher adsorption pressure level. Line 3 containing valve 4 is provided to divert compressed air from the system, if desired. Line 1 is divided into two feed lines, 5 and 6, for passage of feed air to each of the two beds in the illustrated PSA system on a cyclic basis. Line 5, containing valve 7, passes to the bottom, or feed end, of adsorbent bed 8, while line 6, containing valve 9, passes to the bottom, or feed end, of adsorbent bed 10. Line 11, containing valve 12 passes from the upper, or product end, of adsorbent bed 8. Line 13, containing valve 14, passes from the upper, or product end, of adsorbent bed 10. Lines 11 and 13 join to form line 15, containing check valve 16, that passes to storage tank 17, from which enriched oxygen is recovered through line 18 as a high purity product stream.

At the bottom end of the adsorbent beds, lines 19 and 20 extend from lines 5 and 6, respectively, and contain valves 21 and 22, respectively. Said lines 19 and 20 join to form line 23 that extends to line 24 containing vacuum pump 25, valve 26, storage tank 27, and product compressor 28, from which enriched gas is passed through line 29 to the membrane system as referred to below. Line 30, containing valve 31, extends from line 24 between vacuum pump 25 and valve 26.

The purity of the waste gas removed from the adsorbent beds is monitored by purity analyzer 32 in response to input signal 33 taken from line 24 between vacuum pump 25 and the point at which line 30 extends from said line 24. Purity analyzer 32 is also adapted to monitor the gas purity in storage tank 27 by input signal 34. Purity analyzer 32 is adapted to send output signal 35 to control system 36, which is used, through output signals 37 and 38, to appropriately operate valves 31 and 26, respectively, so as to cause PSA waste gas in line 24 to pass through either line 30 or continue to pass through line 24 to storage tank 27. Control system 36 also monitors the amount of enriched gas present in storage tank 27 through input signal 39.

In the operation of the PSA portion of the system shown in the drawing, compressed feed air passes through beds 8 and 10 at the upper adsorption pressure on a cyclic basis. Adsorbent beds 8 and 10 compromise equilibrium-type adsorbent material, such as zeolitic molecular sieves, capable of selectively adsorbing nitrogen, while oxygen, or oxygen and argon, passes through the beds and is recovered in line 15 for passage to storage vessel 17 and use as enriched oxygen product. Upon desorption during this portion of the adsorption/desorption PSA processing sequence in each bed, the more readily adsorbable nitrogen, i.e. typical waste gas in PSA-oxygen operations, passes from the lower, feed end of the bed being depressurized to the lower desorption pressure for passage to discharge line 23. When vacuum pump 25 is used to lower the pressure for desorption, nitrogen gas flows through either valve 21 or valve 22 to said discharge line 23 and from there to line 24, to vacuum pump 25, and to line 30 for discharge from the system.

In the practice of the invention, the nitrogen waste stream is not sent continuously to line 30, but is split into two separate streams via control valves 26 and 31. The nitrogen gas that passes through valve 31 and line 30 represents the net waste stream of the process. Nitrogen flow through valve 26 comprises the enriched nitrogen gas recovered from the waste stream. The instantaneous purity of the waste stream from the PSA bed undergoing depressurization is monitored by purity analyzer 32, with an output signal rom purity analyzer 32 being sent to control system 36 to control the passage of the nitrogen-containing gas to waste through said line 30 containing valve 31 or to storage tank 27 though valve 26, based on the minimum purity acceptable to the end user. When the instantaneous pressure is below the acceptable level, the flow is directed through valve 31 and line 30 for discharge from the system as the "net" waste, as by discharge to the atmosphere. When the instantaneous purity is above this level, the flow is directed through valve 26 into storage tank 27. This tank is preferably a bladder type, as opposed to a constant volume, tank in order to minimize the volume thereof needed for purposes of the invention. The storage tank is required to maintain a constant flow of enriched nitrogen product to the end user, since the flow through valve 26 will be discontinuous. Since the waste gas from the PSA beds is at the lower desorption pressure, compression of the recovered enriched nitrogen product stream is typically required. Compressor 28 is used to supply enriched nitrogen gas to the membrane system employed in the practice of the invention to produce a further enriched nitrogen stream for passage to the end user.

As indicated above, control system 36 also monitors the amount of enriched gas in storage tank 27 by means of input signal 39. At times when the storage tank is not capable of holding any more gas, said signal 39 will override purity input signal 33 and cause gas to be vented through valve 31 to waste, regardless of its purity.

As a processing option, control system 36 can be used to monitor the purity of the gas in storage tank 27 by means of input signal 34, as opposed to the instantaneous purity measured by input signal 33 to purity analyzer 32 as indicated above If the purity level in the tank were above the acceptable level, the user would recover more of the waste gas by simply increasing the time increment in which valve 26 is left open. Likewise, valve 31 would be left closed for a longer period of time so that less gas would be vented as waste. As previously indicated, input signal 39 would override this purity signal if the gas volume in storage tank 27 reached its maximum level.

As a further processing control option, the system can be set up to recover the enriched nitrogen product gas, once the instantaneous purity profile is known, without continuously monitoring either the instantaneous purity or the purity of the gas in the storage tank. In this case, the control valves would be preset in control system 36, based on the required time increment in which the waste gas should be recovered. The control valves would operate based on these present time periods, and their operation would then not be a function directly of either purity. The only signal that would override these preset increments would be signal 39, indicating that storage tank 27 was full.

In a typical waste stream profile, the waste purity of a particular PSA system can be plotted, e.g. as % oxygen present in said stream, against time, as for the particular processing steps employed in the overall adsorption/desorption/repressurization processing sequence. In this regard, it should be noted that PSA processing sequences commonly employ a pressure equalization step in which gas is released from the product end of one bed and is passed to the product end of another bed in the system, i.e. the other bed in the two bed embodiment of FIG. 1, so as to equalize the pressure in the two beds. During such pressure equalization step, neither air compressor 2 nor vacuum pump 25 are required. Therefore, both are in an "unloaded" state during this period of time. Thus, air compressor 2 takes in air through line 1, compresses it to a slightly elevated pressure, and discharges this air to the atmosphere through valve 4. Similarly, vacuum pump 25 takes in air through valve 41 and lines 42 and 24, compresses it to slightly elevated pressure, and discharges this air to the atmosphere throught valve 31. Thus, air flows through vacuum pump 25, as opposed to waste gas, during the unload portion of the cycle, i.e. during pressure equalization with a depressurization of one of the beds and during a subsequent pressure equalization with repressurization of that bed at a later portion of the overall processing sequence. The highest oxygen concentration will occur during such unload steps, in which instances the oxygen concentration rises to nearly air quality levels (21%). Once the regeneration portion of the cycle begins following cocurrent depressurization-pressure equalization of a particular bed, the oxygen concentration immediately decreases. With regard to the unload steps, it should be noted that the oxygen purity does not reach the 21% level because of the short duration of the unload period and mixing effects in the processing line.

It will be appreciated that the waste stream profile will vary depending upon the particular operating cycle time employed, the adsorbent material used, the number of adsorbent beds employed, the particular PSA processing sequence employed, and the like. Apart from said unload portions of the cycle, it should be noted that the oxygen concentration of the waste will generally be high during the early portion of the desorption step in a bed. Given a maximum acceptable oxygen concentration in the recovered waste stream, the optimal time duration for recovering enriched nitrogen product gas can readily be determined. In an illustrative example based on the two bed system of the drawing, and for instance, if the maximum acceptable purity were 8% oxygen, it was determined that after about 11 seconds of the about 27 second adsorption step in one bed, the waste stream in the other bed being regenerated would have an oxygen concentration of 8% or less. In such example, this state would continue, and nitrogen product gas would be captured, until the start of the unload step, i.e. pressure equalization between the beds. At this point, the waste gas would be vented as in conventional PSA operations. In this regard, it should be emphasized that the average oxygen purity of the waste gas recovered from the PSA system as nitrogen enriched product will obviously be less than the maximum acceptable level.

As suggested above, the optimal time increments for recovery of high purity or enriched nitrogen product can be determined from such a waste stream purity profile graph for any given PSA-oxygen system of the type described above. The optimal time increment will, of course, change with changes in the PSA processing sequence and with changes in the cycle step times. In general, if the time increments all changed by an equal percentage, it would be expected that the duration for recovering the waste gas as said enriched nitrogen product would change by the same percentage. In all cases, the exact time increments would be determined by instantaneously monitoring the waste gas purity as described above.

For the same maximum allowable oxygen concentration in the waste gas, the time increment for recovering the nitrogen product gas may be longer or shorter depending on the particular features of any given PSA-oxygen system. Furthermore, the time increment may occur at a different point in the PSA processing sequence of one PSA system and process than of another. The optimal recovery period will be a function of the particular adsorbent, cycle sequence and step time increments used in a particular PSA system.

In the particular illustrative example based on the embodiment of the drawing, the average oxygen concentration of the waste gas from the PSA beds was found to be 8.5%. If all of the waste gas was captured, with the air flow recited during the unload steps, a nitrogen gas stream with 8.5% oxygen would be obtained. By recognizing that the instantaneous purity of the waste stream varies during its production and by recovering only a specific portion of the waste gas stream, a higher purity nitrogen stream, i.e. one with a lower oxygen concentration, can be desirably obtained. For instance, in the example above, the average purity of the nitrogen product obtained can be enhanced, i.e. by lowering the average oxygen concentration to about 7.5%, by recovering only that portion of the PSA waste gas that contains 8% oxygen or less.

It will be understood that various changes and modifications can be made in the details of the invention without departing from the scope of the invention as set forth in the appended claims. Thus, any commercially available adsorbent capable of selectively adsorbing either nitrogen or oxygen from feed air can be employed. Equilibrium-type adsorbents, such as zeolitic molecular sieve materials, e.g. 13X, 5A, 10X and mordenite, can thus be employed, and will selectively adsorb nitrogen as the more readily adsorbable component of feed air. Rate selective adsorbent materials, such as carbon molecular sieves, capable of selectively adsorbing oxygen from feed air can also be employed. It will also be appreciated that the particular PSA processing sequence employed can be varied as is generally known in the art. While the general adsorption/desorption/repressurization sequence will pertain to the PSA operation, various other processing steps can also be employed as part of the processing sequence, as is known in the PSA art. Thus, the PSA-oxygen sequence may comprise a sequence such as (1) adsorption at upper adsorption pressure, (2) cocurrent depressurization with release of gas from the non-feed end of the bed, with said gas being used for providing purge gas to another bed; (3) cocurrent depressurization-pressure equalization; (4) countercurrent depressurization with release of gas from the feed end of the bed, depressurizing the bed to a lower desorption pressure, including such depressurization to a subatmospheric pressure under vacuum conditions; (5) purge at the lower desorption pressure; (6) partial repressurization by pressure equalization; and (7) further repressurization to upper adsorption pressure with feed air. A particular PSA-nitrogen sequence is that of the Werner et al. patent, namely U.S. Pat. No. 4,599,094, comprising: (1) introducing coproduct effluent gas from another bed to the discharge end of the bed, to increase the pressure to an intermediate level; (2) further repressurization with feed air to the upper adsorption pressure; (3) passing more readily adsorbable nitrogen to the feed end of the bed at said upper adsorption pressure as cocurrent purge; (4) countercurrently depressurizing the bed to an intermediate pressure by discharging more readily adsorbable nitrogen from the feed end of the bed; (5) further countercurrently depressurizing the bed to a subatmospheric desorption pressure; (6) countercurrently purging the bed with less readily adsorbable oxygen introduced to the discharge end of the bed, to discharge additional amounts of more readily adsorbable nitrogen from the feed end of the bed; and (7) repeating steps (1)–(6) on a cyclic basis with additional quantities of feed air being passed to the bed during said step (2).

It will be understood that the invention can be practiced in adsorption systems having at least one adsorbent bed, preferably in systems having from two to four adsorbent beds, more preferably two or three adsorbent beds.

In the practice of the invention, the enriched nitrogen gas in line 29, which, of itself, may be a desirable product gas for some purposes, provides a high pressure stream to membrane system 43, adapted for the removal of water, carbon dioxide, and other such impurities, as well as same additional oxygen, from the enriched nitrogen stream, thereby providing a high purity nitrogen stream advantageous for practical commercial operations downstream of the PSA/membrane system herein described and claimed. As shown in the drawing, compressor 28 is used to supply a high pressure, continuous flow of gas through line 29 to said membrane system 43. The desired nitrogen component of this stream is further enriched by the membrane system, by the removal of at least one undesirable component, or impurity from this stream. The further enriched nitrogen stream is recovered in line 44, while the recited component(s) are discharged through line 45.

Those skilled in the art will appreciated that, for purposes of the invention, the specific type of membrane system employed is not critical to the inventory provided, of course, that the membrane is one capable of effectively separating the enriched component desired to be purified from other components or impurities present in the enriched gas stream passed to membrane system 43. Thus, the composition of the membrane, the type of membrane, i.e., composite membrane or asymmetric membrane, the number of membrane stages employed the operating parameters and the like will vary depending upon the gas composition in storage tank 27 and the gas purity and other requirements of a particular end user.

The integrated PSA/membrane system of the invention advantageously employs the PSA waste stream to minimize the power consumption and capital cost of the membrane system. With reference to a typical PSA-oxygen system, for example, the waste stream will typically contain about 10% oxygen, with the balance being mainly nitrogen. Using this stream as the feed gas to the membrane system results in an economic advantage composed to the passing of feed air to the membrane system. To produce an equal quantity of high purity nitrogen, the use of the PSA-oxygen waste stream allows a smaller gas compressor, and less membrane surface area, to be used, since less oxygen is present in the feed gas supplied to the membrane system. In addition, such a smaller compressor would draw less power than would be the case if a feed air stream were employed.

The separation and use of a desired portion of the PSA waste stream enables the non-product component purity to be enhanced, and results in a further reduction in the size of compressor 28 in the embodiment of the drawing, thereby reducing its capital cost and power consumption. In addition, this higher purity, preferred embodiment of the invention allows a smaller membrane system to be utilized, thereby additionally reducing the capital cost requirements of the overall system, as in the illustrated production of the high purity nitrogen from the waste stream of a PSA-oxygen system.

While recovery of only the portion of the waste stream containing the highest nitrogen concentration is generally preferred, the scope of the invention will be understood not to be limited to such embodiments. The membrane system can readily be based upon the expected purity of the waste gas recovered from the PSA-oxygen system, and the purity of the product gas required by the end user. Where the PSA waste stream contains oxygen, carbon dioxide and water as its main components, other than nitrogen, the membrane system will be used to remove at least one of these components in order to produce a further enriched, high purity nitrogen product stream.

It will be appreciated that various changes and modifications can be made in the details of the process and system as herein described without departing from the invention as set forth in the appended claims. Thus, as noted above, composite or asymmetric membrane structures can be employed in the membrane system of the invention. While dense membranes can also be employed but are not preferred because of their inherently lower permeability characteristics, the permeable membranes used in the practice of the invention will commonly be employed in assemblies of membrane bundles, typically positioned within enclosures to form membrane modules that comprise the principal element of a membrane system. A membrane system may comprise a single module or a number of such modules, arranged for either parallel or series operation.

The membrane modules can be constructed using bundles of membranes in any convenient hollow fiber form, or in spiral wound, pleated, flat sheet or other desired membrane configurations. Membrane modules are constructed to have a feed gas (air) side, and an opposite, permeate gas exit side. For hollow fiber membranes, the feed side can be either the bore side for inside-out operation, or the outside of the hollow fibers for outside-in operation. Means are provided for introducing feed gas to the system and for withdrawing both permeate and non-permeate streams as is generally shown in the drawing.

It will be appreciated that the composition of the membrane used in the practice of the invention will have a high selectivity or separation factor for the desired separation, e.g. for water over nitrogen. Thus, water and other undesired components desired to be separated from the enriched nitrogen stream passed to membrane 43 of the drawing. The water/nitrogen separation will advantageously be at least 50, preferably greater than 1,000, for enhanced removal of water from the enriched nitrogen stream. In addition, the membrane should have a relatively low permeability for nitrogen so as to minimize the loss of desirable high purity product. Cellulose acetate is an example of a membrane material satisfying such criteria. It will be appreciated, however, that a variety of other membrane materials can also be employed, such as ethyl cellulose, silicone rubber, polyurethane, polyamide, polystyrene and the like.

While the invention has been described, with respect to air separation operations, particularly with reference to PSA-oxygen systems and the recovery of high purity nitrogen from the waste therefrom, it should be noted that PSA-nitrogen systems can likewise be operated so as to recover high purity oxygen from the waste stream. It will be appreciated that, in such a case, the oxygen waste stream will be the less readily adsorbable component removed from the non-feed end of the bed during the time in which feed air is passed to the bed for the selective adsorption of nitrogen, with passage of the oxygen component through the bed at the upper adsorption pressure level. It will be further understood that, in such embodiments, the control system, purity analyzer and other features illustrated in the drawing may be used at the opposite end of the bed to desirably separate an enriched oxygen stream from a net waste stream, with said enriched oxygen typically being passed to a storage tank, from which gas is passed through a compressor to a membrane system for further purification and recovery of high purity oxygen in a manner such as is illustrated in the drawing with respect to the purification and recovery of high purity nitrogen.

The invention will be seen to enhance the benefits of PSA-air separation operations in practical commercial operations. By enabling dual, high purity product recovery, the invention significantly enhances the technical and economic feasibility of employing PSA-air separation process and systems complemented by highly desirable and convenient membrane gas separation systems, to produce both high purity oxygen and high purity nitrogen.

What is claimed is:

1. In a pressure swing adsorption process for the recovery of either oxygen or nitrogen as a high purity product in an adsorption system having at least one adsorbent bed containing adsorbent material capable of selectively adsorbing either oxygen or nitrogen as the more readily adsorbable component of feed air, said process comprising, on a cyclic basis in each bed, an adsorption/desorption/repressurization sequence in which product gas is recovered from the system and a waste stream is separately discharged therefrom, the improvement comprising:
    (a) separating a portion of the waste stream from a net waste portion thereof, the separated portion having a non-product component purity higher than the average purity level of said component in the waste stream, said purity level being at least equal to a minimum acceptable level desired for said non-product component;
    (b) passing said separated portion of the waste stream to a membrane system capable of selectively recovering either nitrogen or oxygen present as a non-product component of the separated portion of the waste stream from impurities present therein;
    (c) discharging the net waste portion of the waste stream;
    (d) discharging said impurities form the membrane system; and
    (e) recovering the non-product component of the separated portion of the waste stream as a high purity second product, whereby the recovery of high purity oxygen and nitrogen streams enhances the efficiency of the overall air separation process.

2. The process of claim 1 in which the more readily adsorbable component comprises nitrogen, with oxygen comprising a least readily adsorbable component of feed air.

3. The process of claim 2 in which oxygen is the desired high purity product of the adsorption system, with nitrogen being the high purity second product.

4. The process of claim 1 in which the waste stream is monitored to determine its instantaneous purity, with a portion of the waste stream being separated from the net waste portion of said waste stream at such times in the adsorption sequence when its purity meets or exceeds said minimum acceptable level.

5. The process of claim 4 in which said adsorbent material comprises zeolitic molecular sieve material capable of selectively adsorbing nitrogen as the more readily adsorbable component of feed air.

6. The process of claim 1 in which the separated portion of the waste stream passes to a storage tank, with the purity of the separated portion of non-product component in the storage tank being monitored and said separated portion of the waste stream passing to the storage tank for the period of time during which the purity of the separated portion of non-product component meets or exceeds said minimum acceptable level.

7. The process of claim 6 in which said adsorbent material comprises zeolitic molecular sieve material capable of selectively adsorbing nitrogen as the more readily adsorbable component of feed air 8. The process of claim 7 in which oxygen is the product of the adsorption system and nitrogen is the high purity second product.

9. The process of claim 1 in which a portion of the waste stream is separated from the net waste during preset time increments so that said separated portion of the waste stream has a purity that meets or exceeds said minimum acceptable level.

10. The process of claim 1 and including passing the separated portion of the waste stream to a storage tank, monitoring the amount of said separated portion of the waste stream passed to the storage tank, and diverting additional amounts of said waste stream for discharge when said storage tank is filled with said separated portion of the waste stream.

11. In a pressure swing adsorption system for the recovery of either oxygen or nitrogen product in an adsorption system having at least one adsorbent bed containing adsorbent material capable of selectively adsorbing either oxygen or nitrogen as the more readily adsorbable component of feed air, said system being adapted for operation of a processing sequence comprising adsorption, desorption and repressurization in which product gas is recovered from the system and a waste stream is separately discharged from said system, the improvement comprising:
(a) a permeable membrane system capable of selectively recovering either nitrogen or oxygen present as a principal component of said waste stream from impurities present therein;
(b) control means for separating a portion of the waste stream from a net waste portion thereof, the separated portion having a non-product component purity higher than the average purity level of said component in the waste stream, said purity level being at least equal to a minimum acceptable level established for the non-product component;
(c) conduit means for passing the separated portion of the waste stream to said membrane system;
(d) conduit means for discharging the net waste portion of the waste stream;
(e) conduit means for discharging the impurities form the membrane system; and
(f) conduit means for separately recovering the principal component of the waste stream from the membrane system, whereby the recovery of high purity oxygen and nitrogen streams enhances the efficiency of the overall air separation operation.

12. The system of claim 11 in which said adsorbent material is capable of adsorbing nitrogen as the more readily adsorbable component of feed air, oxygen comprising the less readily adsorbable component.

13. The system of claim 12 in which the adsorbent material comprises zeolitic molecular sieve.

14. The system of claim 11 and including analyzer means for monitoring the instantaneous purity of the waste stream, and control means for separating said portion of the waste stream from the net waste stream whenever its purity meets or exceeds said minimum acceptable level.

15. The system of claim 14 adapted for the recovery of high purity oxygen as the product of the adsorption system and for the recovery of high purity nitrogen as the second product.

16. The system of claim 11 and including (a) a storage tank for said separated portion of the waste stream, (b) conduit means for passing said separated portion to the storage tank, (c) analyzer means for monitoring the purity of the separated portion of non-product component in the storage tank, and (d) control means for passing said separated portion of the waste stream to said storage tank for a period of time during which the purity of the separated portion of non-product component meets or exceeds said minimum acceptable level.

17. The system of claim 16 in which said adsorbent material comprises zeolitic molecular sieve material capable of selectively adsorbing nitrogen from air.

18. The system of claim 11 and including control means for presetting the time during which a portion of the waste stream is separated from the net waste portion thereof, such that said separated portion of the waste stream has a purity that meets or exceeds said minimum acceptable level.

19. The system of claim 18 in which said adsorbent material comprises zeolitic molecular sieve material capable of selectively adsorbing nitrogen from air.

20. The system of claim 11 and including (a) conduit means for passing the separated portion of the waste stream to a storage tank, (b) monitoring means for determining the amount of said separated portion of the waste stream passed to the storage tank, and (3) control means for diverting additional amounts of the waste stream for discharge when the storage tank is filled with said separated portion of the waste stream.

* * * * *